United States Patent [19]
Schiller

[11] Patent Number: 5,245,177
[45] Date of Patent: Sep. 14, 1993

[54] ELECTRO-OPTICAL SYSTEM FOR DETECTING THE PRESENCE OF AN OBJECT WITHIN A PREDETERMINED DETECTION SYSTEM

[76] Inventor: Norman H. Schiller, 163-16 Willets PT Blvd., Whitestone, N.Y. 11357

[21] Appl. No.: 782,292

[22] Filed: Oct. 24, 1991

[51] Int. Cl.⁵ .............................................. G01V 9/04
[52] U.S. Cl. ..................................... 250/221; 250/561
[58] Field of Search .............. 250/221, 222.1, 208.2, 250/561; 356/1, 4; 340/555, 556, 557

[56] References Cited

U.S. PATENT DOCUMENTS

| | | | |
|---|---|---|---|
| 3,514,620 | 5/1970 | Wiggerman | 250/239 |
| 3,532,886 | 10/1970 | Kruger, Jr. et al. | 250/222.1 |
| 3,558,230 | 1/1971 | Fowler | 356/138 |
| 3,624,401 | 11/1971 | Stoller | 250/222.1 |
| 3,785,738 | 6/1974 | Hoppke | 356/138 |
| 3,918,814 | 11/1975 | Weiser | 356/138 |
| 3,942,894 | 3/1976 | Maier | 356/153 |
| 3,954,339 | 5/1976 | Atwood et al. | 356/138 |
| 4,068,222 | 1/1978 | Treviranus | 250/221 |
| 4,185,192 | 1/1980 | Wagner | 250/221 |
| 4,282,430 | 8/1981 | Hatten et al. | 250/221 |
| 4,306,147 | 12/1981 | Fukuyama et al. | 250/221 |
| 4,332,468 | 6/1982 | Stutzle | 356/5 |
| 4,346,293 | 8/1982 | Fetzer | 250/221 |
| 4,434,363 | 2/1984 | Yorifuji et al. | 250/221 |
| 4,479,053 | 10/1984 | Johnston | 250/221 |
| 4,490,037 | 12/1984 | Anagnostopoulos et al. | 356/1 |
| 4,655,586 | 4/1987 | Stauffer | 356/1 |
| 4,775,235 | 10/1988 | Hecker et al. | 356/376 |
| 4,815,840 | 3/1989 | Benayad-Cherif et al. | 356/1 |
| 4,818,887 | 4/1989 | Weishaupt et al. | 250/221 |
| 4,849,643 | 7/1989 | Mundy | 250/560 |
| 4,899,041 | 2/1990 | Fetzer et al. | 250/221.1 |
| 4,936,676 | 6/1990 | Stauffer | 356/375 |
| 4,971,440 | 11/1990 | Winckler et al. | 356/138 |
| 4,975,565 | 12/1990 | Schmidt et al. | 250/203.2 |

OTHER PUBLICATIONS

Hamamatsu Photonics K.K. Aug. 1990 spec sheet for Light Modulation Photo IC S4282-11 (or S3599) and S4285-40.

Primary Examiner—David C. Nelms
Assistant Examiner—John R. Lee
Attorney, Agent, or Firm—Irving M. Kriegsman; Edward M. Kriegsman

[57] ABSTRACT

A system for detecting the presence of an object within a predetermined detection region. The system comprises a light source for producing a beam of light in the direction of the object to be detected and a pair of light detector units. The light detector units are angularly oriented so that their fields of view intersect to form a detection zone, the portion of the detection zone illuminated by the light beam defining a detection region. The outputs from said light detector units are coupled to an AND gate which, upon simultaneous receipt of output signals from both light detector units, emits a detection signal. If the object is disposed within the detection region and is illuminated by the light source, both light detector units will simultaneously emit an output signal, thereby causing the AND gate to emit a detection signal. In contrast, if the object is disposed outside of the detection region and/or is not illuminated by the light source, only one or none of the light detector units will emit an output signal and the AND gate will not emit a detection signal.

21 Claims, 4 Drawing Sheets

ELECTRO-OPTICAL SYSTEM FOR DETECTING THE PRESENCE OF AN OBJECT WITHIN A PREDETERMINED DETECTION SYSTEM

BACKGROUND OF THE INVENTION

The present invention relates to an electro-optical system for detecting the presence of an object and more particularly to an electro-optical system for detecting the presence of an object within a predetermined detection region.

It is often desirable, particularly in the field of industrial control applications, to be able to determine electro-optically the presence of an object within a predetermined detection region. For example, one might want to detect the presence of an object as it passes by on a moving conveyor belt. As can be appreciated, one problem which may be associated with making such determinations is the indication of false positive signals generated by the presence of objects beyond the outboard edge of the conveyor belt and/or before the inboard edge of the conveyor belt.

In U.S. Pat. No. 4,899,041 to Fetzer et al., a light sensor for detecting an object in a certain distance range is described. The light sensor has a light transmitter which radiates the light along an axis of a transmitter system and two light receiving systems which pick up the light scattered back from an object to be detected along a receiving system axis. A light sensitive element has three detection zones arranged in a row of which the outer zones each receive light via one of the receiving systems from a sensing zone and of which the central detection zone accepts light via both light receiving systems from the background region of the field of view of the light sensor. An output signal which is used for object recognition is obtained by additive superposition of the signals of the detection zones associated with the scanning region and by difference formation with the signal from the detection zone associated with the background region. The sensing distance is adjusted by adjusting a roof edge mirror arranged in front of the light sensitive element.

In U.S. Pat. No. 4,655,586 to Stauffer, an adjustable zone proximity sensor is described. The sensor projects a beam of radiation towards the object. The return radiation is focused on a plane containing two detectors which are mounted substantially edge to edge. When the object is at the exact desired distance, the return radiation will be focused in the area between the two detectors so both of the detectors will receive the same amount of radiation. Thereafter, as the object moves away from the exact range, the image will move onto one of the detectors and away from the other, while if the object moves closer than the exact range, the image will move onto the other of the detectors and away from the first. With appropriate electronics it can be determined whether the return radiation is falling primarily on the one detector, the other detector, or is between them. This then determines whether the object is too far, too near, or at the right distance, respectively.

In U.S. Pat. No. 4,936,676 to Stauffer there is disclosed a surface position sensor utilizing a beam of energy reflected from the surface through an optical receiver to a detector wherein an energy blocking member having a receiver aperture permits only energy substantially parallel to the optic axis of the optical receiver to pass through to the detector.

Other patents of interest include U.S. Pat. No. 4,975,565 to Schmidt et al., U.S. Pat. No. 4,971,440 to Winckler et al., U.S. Pat. No. 4,815,840 to Benayad-Cherif et al., U.S. Pat. No. 4,775,235 to Hecker et al., U.S. Pat. No. 4,490,037 to Anagnostopoulos et al., U.S. Pat. No. 4,332,468 to Stutzle, U.S. Pat. No. 3,954,339 to Atwood et al., U.S. Pat. No. 3,942,894 to Maier, U.S. Pat. No. 3,918,814 to Weiser, U.S. Pat. No. 3,785,738 to Hoppke, U.S. Pat. No. 3,558,230 to Fowler, and U.S. Pat. No. 3,514,620 to Wiggerman.

SUMMARY OF THE INVENTION

It is an object of the present invention to provide an electro-optical system for detecting the presence of an object within a predetermined detection region.

It is another object of the present invention to provide a system as described above that has a large depth of field detection capability.

It is still another object of the present invention to provide a system as described above that has a near zero distance minimum range capability.

It is still yet another object of the present invention to provide a system as described above that has a limited maximum range capability.

It is a further object of the present invention to provide a system as described above that has a minimal number of parts.

It is still a further object of the present invention to provide a system as described above that is compact in size, easy and inexpensive to manufacture, and easy to operate.

It is yet still a further object of this invention to provide a system as described above wherein the maximum and minimum limits of the detection region and the location of the region can be adjusted.

It is another object of this invention to provide a system as described above wherein false signals caused by objects outside of the detection region are avoided.

It is still another object of this invention to provide a system for detecting the presence of an object within a predetermined range of distance from the system.

Additional objects of the invention, as well as features and advantages thereof, will be set forth in part in the description which follows, and in part will be obvious from the description or may be learned by practice of the invention. The objects of the invention also may be realized and attained by means of the instrumentalities and combinations particularly pointed out in the appended claims.

To achieve the foregoing objects and in accordance with the teachings of the present invention, an electro-optical system for detecting the presence of an object within a predetermined detection region is provided which comprises a light source for projecting a beam of light in the direction of the object to be detected, a pair of light detector units for receiving light reflected from the object to be detected upon illumination by said light beam and for producing output signals indicative thereof, said pair of light detector units being constructed and angularly oriented relative to each other so that their fields of view intersect to provide a detection zone common to both of said fields of view, the portion of the detection zone illuminated by said beam of light constituting a detection region, and means coupled to said pair of light detector units for producing a detection signal when an output signal has been emitted from both of said light detector units, said detection signal indicating that the object to be detected is within said detection region.

As used in this specification, the term "reflected light" is intended to mean specularly reflected light and/or diffusely reflected (i.e. scattered) light.

It is to be understood that, instead of using a light source and light detector units, alternative forms of electromagnetic radiation or acoustic radiation may be used in the present invention along with suitable detector units.

BRIEF DESCRIPTION OF THE DRAWINGS

The accompanying drawings, which are hereby incorporated into and constitute a part of this specification, illustrate certain embodiments of the invention and, together with the description, serve to explain the principles of the invention. In these drawings wherein like reference numerals represent like parts.

DETAILED DESCRIPTION OF PREFERRED EMBODIMENTS

The present invention is directed to an electro-optical system for detecting the presence of an object within a predetermined detection region. The present invention accomplishes this in one embodiment by using a system which includes a light source for emitting a beam of light and a pair of light detector units which are angularly oriented so that their respective fields of view intersect to define a detection zone, the portion of the detection zone illuminated by the beam of light constituting the detection region. As a result of this arrangement, light striking an object located anywhere within the detection region causes both detectors to receive light reflected back from the object and to emit output signals whereas illumination of an object located outside of the detection region causes only one or neither of the detector units to receive reflected light and to emit an output signal.

By changing the angular orientation of the two light detector units, the size and range of distances to the detection region can be changed. Also, the size of the detection region can be changed by changing the cross-sectional size of the light beam.

Figure 1:
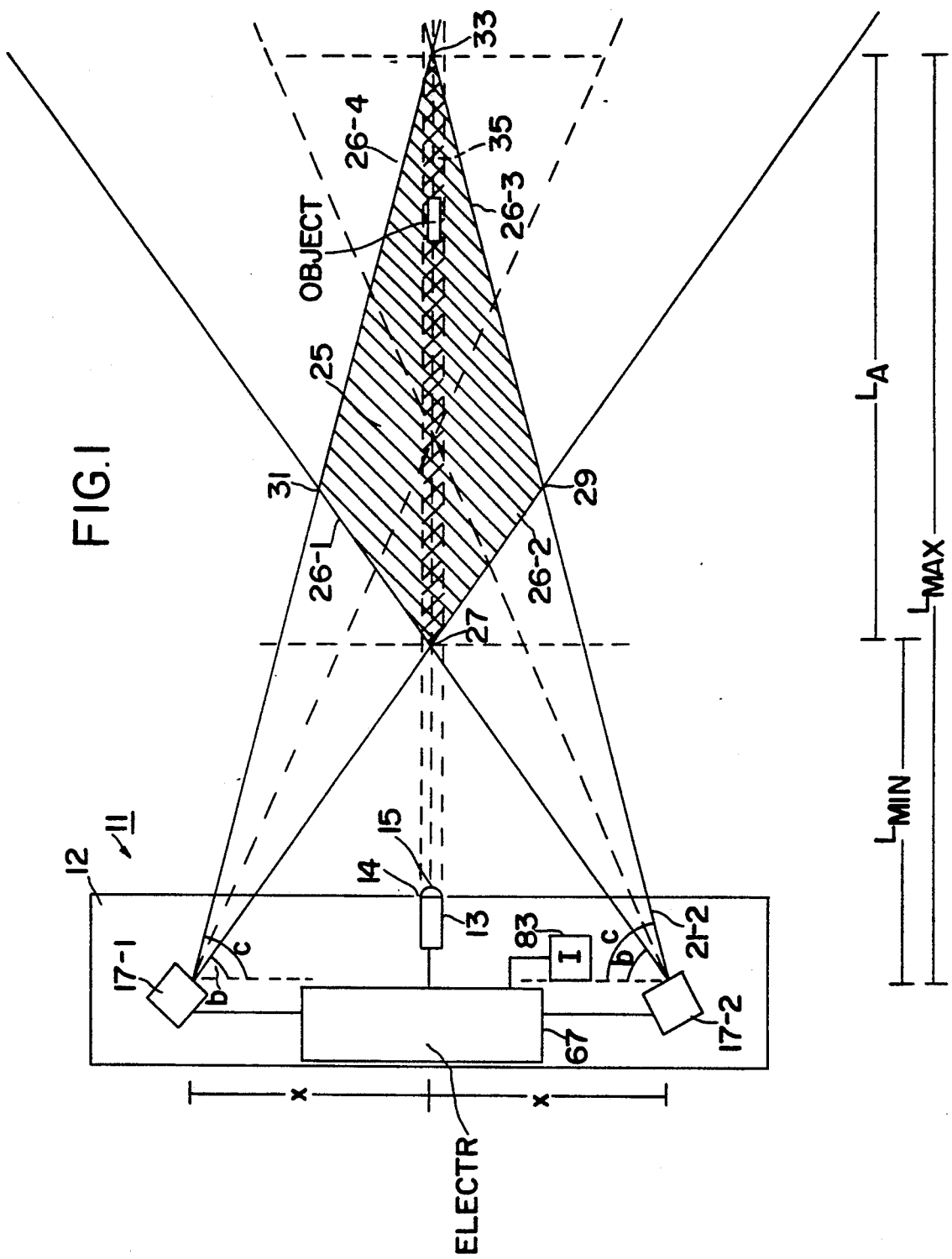
FIG. 1 is a schematic diagram of one embodiment of an electro-optic system for detecting the presence of an object within a predetermined detection region, the system being constructed according to the teachings of the present invention.

Referring now to FIG. 1, there is illustrated a schematic diagram of one embodiment of a system for detecting the presence of an object, the system being constructed according to the teachings of the present invention and represented generally by reference numeral 11.

System 11 includes a housing 12. A light emitting diode (LED) 13 for producing a beam of light which is used to illuminate an object to be detected is disposed in housing 12. The beam of light emitted by LED 13 projects out through an opening 14 in housing 12 and is collimated by a lens 15 so as to provide a collimated beam of light.

A pair of light detector units 17-1 and 17-2 for receiving light reflected back from the object being detected on illumination by the light beam from LED 13 are also disposed in housing 12.

Detector units 17-1 and 17-2, which are identical in construction have fields of view which are limited by openings 21-1 and 21-2, respectively, formed in housing 12 and are oriented relative to each other so that their fields of view intersect to define a detection zone 25 (shown as a hatched area), detection zone 25 having four sides 26-1, 26-2, 26-3, and 26-4, a front corner 27, a pair of side corners 29 and 31, and a back corner 33. That portion of detection zone 25 which is illuminated by the light beam from LED 13 constitutes a detection region 35 (shown by double hatched lines in FIG. 1). The distance $L_{min}$ from detectors 17-1 and 17-2 to front corner 27 is the minimum limit of the detection region 35 while the distance $L_{max}$ from detectors 17-1 and 17-2 to back corner 33 is the maximum limit of detection region 35. As can be appreciated, by changing the angular orientation of detection units 17 and/or the size of apertures 21 or by the addition of one or more lenses, the length $L_4$ of detection zone 25 as well as its distance to the two detectors can be changed. Furthermore, by changing the cross-sectional size of the light beam from LED 13, the size of detection region 35 can also be adjusted.

Preferably, detector units 17-1 and 17-2 are constructed to offset ambient and/or background light and to provide signal detection which is synchronized with the emission of light from LED 13. Examples of such detector units include, but are not limited to, the solid state Light Modulation Photo IC S4282-11 (or S3599), in particular S4282-72, manufactured by Hamamatsu Photonics K.K. (Hamamatsu City, Japan).

Figure 2:
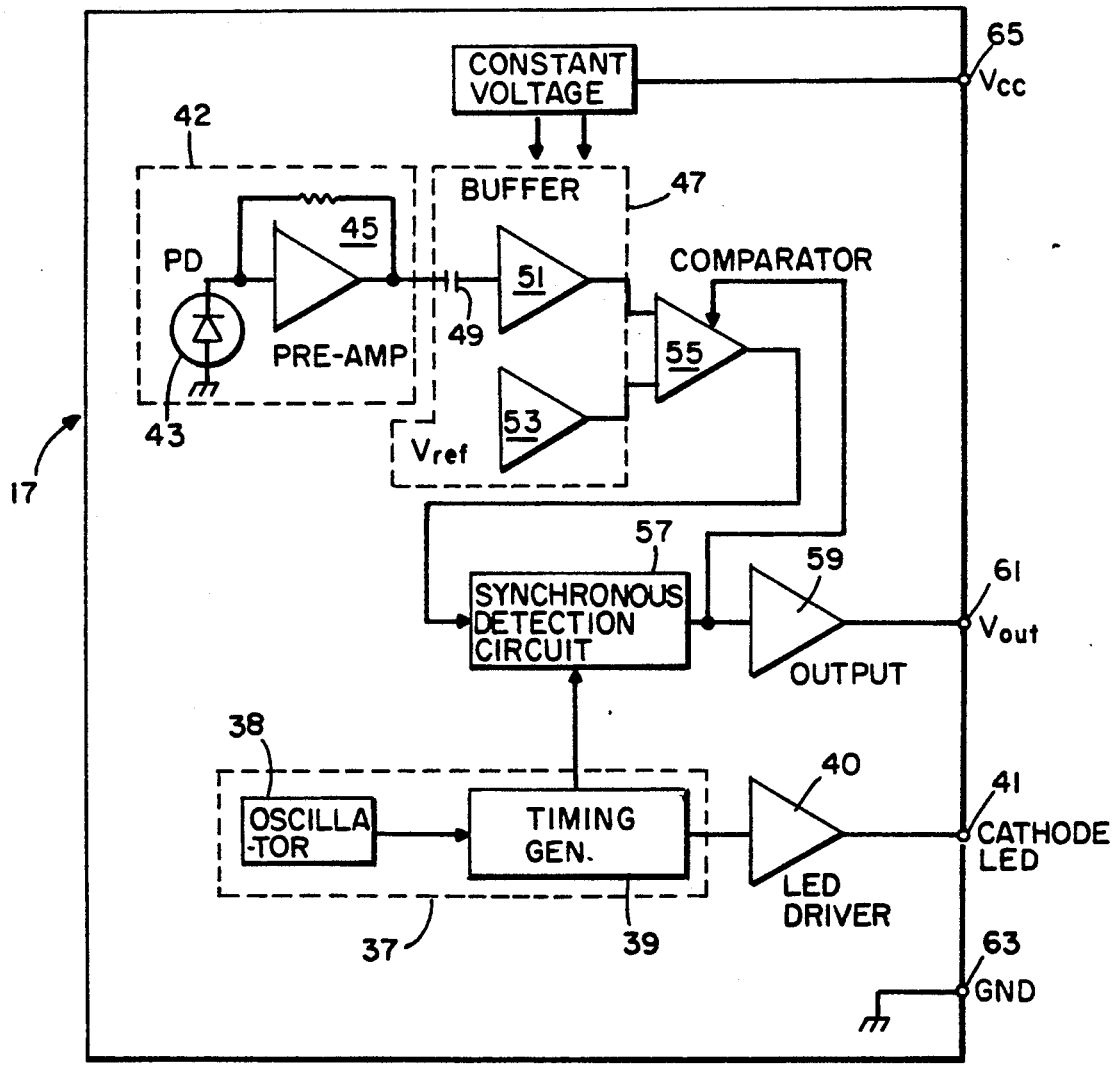
FIG. 2 is a block diagram of one of the detector units in the system of FIG. 1.

Referring now to FIG. 2, the components of detector unit 17 are shown in block diagram form. Unit 17 includes a circuit 37. Circuit 37 comprises an oscillator 38, which produces a reference oscillation output by charging and discharging a built-in capacitor (not shown) with constant current and a timing signal generator 39, into which the oscillation output is fed. Generator 39 creates an LED drive pulse as well as various types of timing pulses for digital signal processing. An LED driver 40, which is coupled at one end to circuit 37, is coupled at the other end to an LED terminal 41.

Unit 17 also includes a circuit 42. Circuit 42 comprises a photodiode 43 having a peak response at 800 nm. The photocurrent of photodiode 43 is converted to a voltage through a pre-amplifier circuit 45. Circuit 45 includes an AC amplifier (not shown) which expands the dynamic range in response to DC or low-frequency background light and boosts the signal detection sensitivity.

Unit 17 additionally includes a circuit 47, which comprises a capacitive coupling 49. Coupling 49 eliminates low-frequency background and DC offset in the pre-amplifier section. A buffer amplifier 51 carries out amplification up to the comparator level. A reference voltage generator circuit 53 produces a comparator-level signal.

Unit 17 further includes a comparator circuit 55. Circuit 55 has a hysteresis function, which prevents chattering caused by small fluctuations in the input light.

Unit 17 also includes a synchronous detection circuit 57. Circuit 57 is configured as a gate circuit and a digital integrator circuit. The gate circuit discriminates input pulses detected when synchronous detection is carried out to prevent operation errors due to a non-synchronous background light. Furthermore, any synchronized background light that cannot be eliminated by the gate circuit will be cancelled by the digital integrator circuit at the next stage.

Unit 17 additionally includes an output circuit 59. The output signal of the circuit 57 is buffered and derived through circuit 59. The output of circuit 59 is coupled to an output terminal 61.

Unit 17 further includes a ground terminal 63 for coupling unit 17 to ground and a voltage terminal 65 for coupling a constant voltage source to unit 17.

Figure 3:
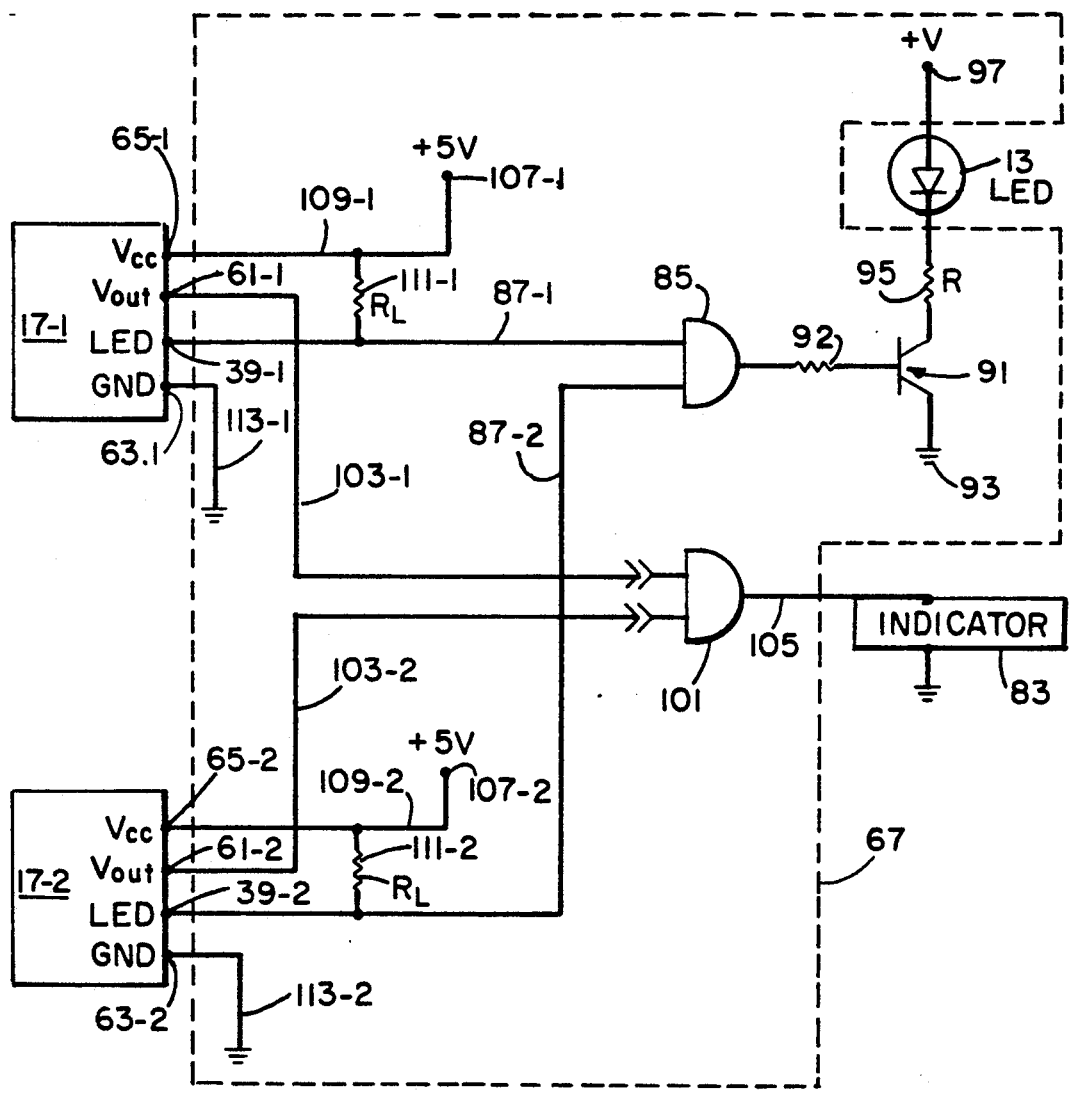
FIG. 3 is a schematic diagram of the electronics in the system shown in FIG. 1.

System 11 further includes electronics 67 for coupling units 17-1 and 17-2 to LED 13 and also for coupling units 17-1 and 17-2 to an indicator 83. As can be seen in detail in FIG. 3, electronics 67 includes a first AND gate 85, which receives inputs from LED terminals 41 of units 17-1 and 17-2 through a pair of lines 87-1 and 87-2, respectively. The output of gate 85 is coupled to the base of a transistor switch 91 through a resistor 92. Transistor switch 91 is connected at one end to a ground 93 and is connected at the other end in series to a resistor 95 which is connected to one end of LED 13. The other end of LED 13 is coupled a+voltage terminal 97. When LED drive signals are simultaneously received by gate 85, an output signal is emitted therefrom which causes switch 91 to close, thus causing current to flow through LED 13. As can be appreciated, the above arrangement serves to synchronize actuation of the photoelectronic components of units 17-1 and 17-2, which because of their particular circuitry require an external trigger. (Consequently, it should be appreciated that, if one were to use detector units that are capable of being externally triggered, AND gate 85 could be eliminated and electronics 67 otherwise modified accordingly.)

Electronics 67 also includes a second AND gate 101, which receives inputs from output terminals 61-1 and 61-2 of units 17-1 and 17-2 through a pair of lines 103-1 and 103-2, respectively. The output of gate 101 is coupled through a line 105 to indicator 83. As can be appreciated, the above arrangement operates in such a way that a detection signal is transmitted to indicator 83 only when signals are simultaneously emitted from units 17-1 and 17-2, i.e., only when an object is present within detection region 35.

Electronics 67 further includes a pair of +5v voltage terminals 107-1 and 107-2, which are electrically connected to terminals 65-1 and 65-2 of units 17-1 and 17-2 by lines 109-1 and 109-2, respectively. A first load resistor 111-1 is coupled across lines 87-1 and 109-1, and a second load resistor 111-2 is coupled across lines 87-2 and 109-2. Terminals 63-1 and 63-2 are coupled to ground through a pair of lines 113-1 and 113-2, respectively.

Indicator 83 may be a counter, a lamp, a buzzer, a relay or other similar device which may be used to indicate to a user that the object is present within the detection region.

It should also be understood that AND gate 101 could be replaced with a NAND gate, in which case a signal would always be sent to indicator 83 or to a similar device except when output signals are simultaneously emitted by units 17-1 and 17-2.

To calculate the minimum limit ($L_{min}$) and maximum limit ($L_{max}$) for system 11, the following formulas may be used:

$$L_{min} = (\text{Tan } b)(x); \text{ and}$$

$$L_{max} = (\text{Tan } c)(x),$$

wherein x represents the distance from the longitudinal axis of detection zone 25 to the active area of one of the detector units, b represents the angle between a line normal to the longitudinal axis of the detection zone 25 and a line representing the nearest part of the field of view of one of the detector units, and c represents the angle between the line normal to the longitudinal axis of the detection zone 25 and a line representing the farthest part of the field of view of one of the detector units. Therefore, as an example, if x were equal to 14 nm, b equal to 71 degrees, and c equal to 86 degrees, $L_{min}$ would be equal to 40.65 mm and $L_{max}$ would be equal to 200.21 mm.

As can be appreciated, $L_{min}$ and $L_{max}$ can be varied, for example, by changing the dimensions of apertures 21-1 and 21-2 and/or by enlarging or diminishing the distance between units 17-1 and 17-2 and/or by altering the angular positions of units 17-1 and 17-2.

It should be understood that, while detector units 17-1 and 17-2 have been shown in FIG. 1 and described above as being symmetrically oriented relative to one another, they could be arranged asymmetrically so long as their fields of view intersect to form a region having defined minimum and maximum limits.

Figure 4:
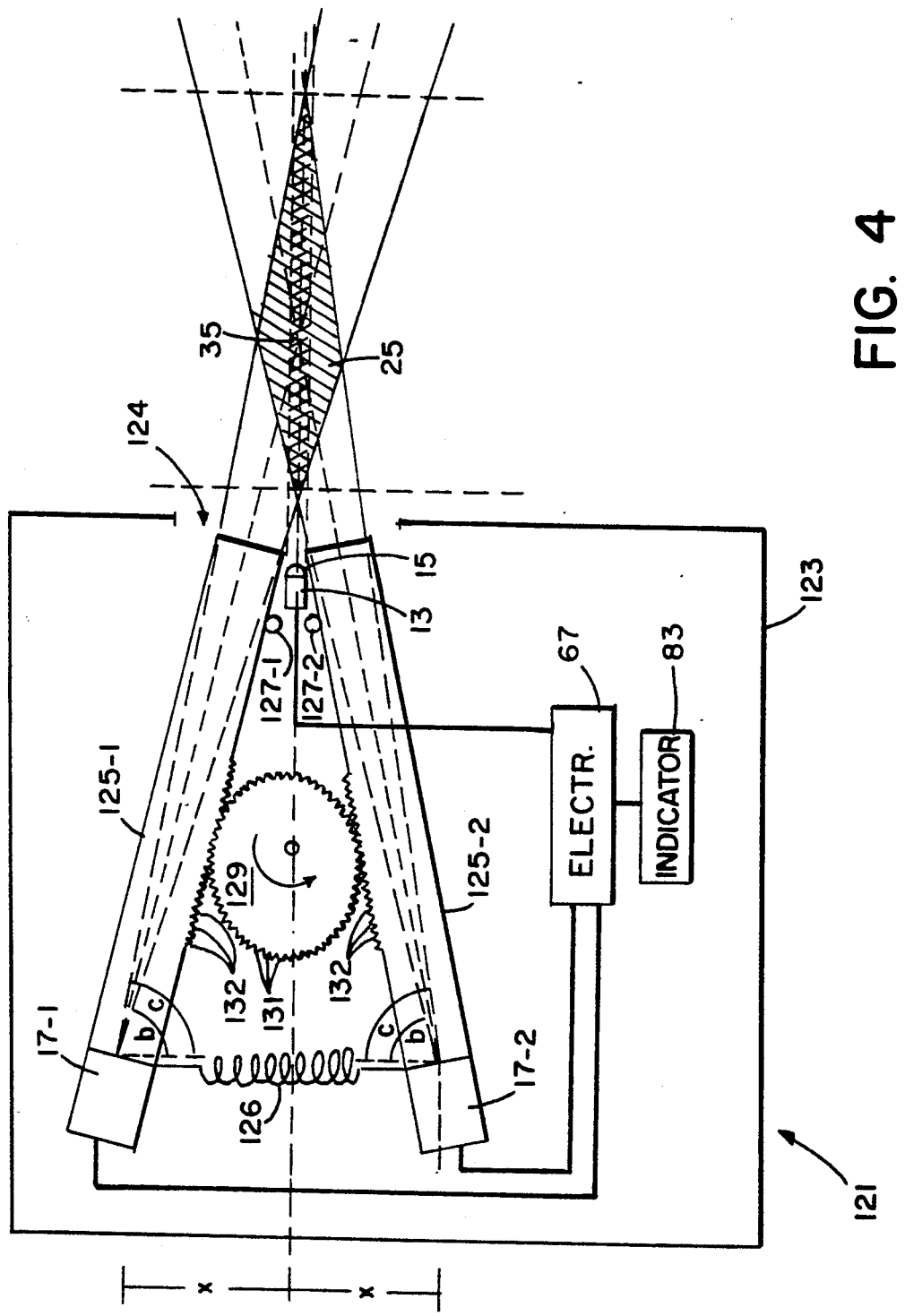
FIG. 4 is a schematic diagram of another embodiment of a system for detecting the presence of an object, the system being constructed according to the teachings of the present invention.

Referring now to FIG. 4, there is shown another embodiment of a system for detecting the presence of an object constructed according to the teachings of the present invention, the system being represented generally by reference numeral 121. As can be seen, system 121 is constructed to include a mechanical arrangement for changing the relative orientation of its detection units so that the dimensions of the detection region can be altered as desired.

System 121 includes a housing 123 for supporting and surrounding the remaining components of system 121 described below. Housing 123 includes an aperture 124 whose function will become apparent below.

System 121, like system 11, includes a pair of detector units 17-1 and 17-2, an LED 13, a lens 15, electronics 67, and an indicator 83. However, unlike system 11, system 121 also includes a pair of elongated, hollow tubings 125-1 and 125-2, which are held together at one end by a spring 126 and which are pivotally mounted at the opposite end about a pair of pivot points 127-1 and 127-2, respectively. Tubings 125-1 and 125-2, whose inner walls are coated with a dark, non-reflective material, are fixedly mounted at one end on units 17-1 and 17-2, respectively. Consequently, the opposite ends of tubings 125-1 and 125-2 serve to limit the respective fields of view of units 17-1 and 17-2 much in the same manner as do apertures 21-1 and 21-2 of system 11.

System 121 also includes means for pivoting tubings 125-1 and 125-2 about pivot points 127-1 and 127-2, respectively. In the embodiment shown, the pivoting means includes a cam 129, which rotates about a pivot point 130. (It should be understood, however, that devices other than a cam may be used to pivot tubings 125.) Cam 129 has a plurality of circumferentially disposed teeth 131, which are adapted to engage complementary teeth 132 disposed on tubings 125-1 and 125-2.

The reason for using an eccentric device, such as a cam, to pivot tubings 125 is to cause tubings 125-1 and 125-2 to be displaced by equivalent angular amounts. However, it should be understood that it is not necessary that tubings 125 be displaced by equivalent angular amounts.

The embodiments of the present invention are intended to be merely exemplary and those skilled in the art shall be able to make numerous variations and modifications to it without departing from the spirit of the present invention. For example, to offset ambient and/or background light, one could illuminate detection region 35 with light of a non-visible wavelength, such as infrared, and use detector units that detect only light of that wavelength. Alternatively, one could simply enclose the system, the detection region and the surrounding space in a housing that is impervious to ambient light. All such variations and modifications are intended to be within the scope of the present invention as defined by the appended claims.

What is claimed is:

1. A system for detecting an object within a detection region comprising:
   a) a light source for projecting a beam of light in the direction of the object to be detected;
   b) a pair of light detector units, said light detector units each including a light detector for receiving light reflected from the object to be detected upon illumination by said light beam and producing output signals indicative thereof, each light detector having a field of view, said pair of light detector units being constructed and angularly oriented relative to each other so that the fields of view of their respective light detectors intersect to provide a four sided detection zone common to both of said fields of view, the beam of light from said light source passing through at least a portion of said four sided detection zone, the portion of the detection zone illuminated by said beam of light constituting a detection region; and
   c) means coupled to said pair of light detector units for producing a detection signal when an output signal has been emitted from both of said light detector units, said detection signal indicting that the object to be detected is within said detection region.

2. The system as claimed in claim 1 further comprising an indicator coupled to said detection signal producing means.

3. The system as claimed in claim 1 further comprising a housing for supporting and surrounding said light source, said pair of light detector units, and said detection signal producing means.

4. The system as claimed in claim 1 further comprising means for changing the angular orientation of said pair of light detector units relative to one another, said changing means comprising a pair of elongated tubes pivotally mounted within said housing, one end of each of said elongated tubes being mounted to a respective light detector unit, and means for pivoting said pair of elongated tubes, said pivoting means comprising a cam disposed between said elongated tubes.

5. The system as claimed in claim 4 and wherein said elongated tubes are fixed in place.

6. The system as claimed in claim 1 wherein said detection signal producing means comprises an AND gate.

7. The system as claimed in claim 1 wherein said pair of light detector units include output signal means for use in triggering said light source.

8. The system as claimed in claim 7 wherein detection by said pair of light detector units is synchronized with actuation of said light source.

9. The system as claimed in claim 1 wherein said fields of view of said pair of light detector units are limited by a pair of apertures.

10. The system of claim 1 wherein said light detectors are photodiodes.

11. The system of claim 1 wherein said light source produces a pulsating beam of light and said system includes means for synchronizing the output of the light source and the output signals from each light detector.

12. The system of claim 1 and further including means for energizing said light source.

13. The system of claim 1 and wherein said fields of view are diverging in shape.

14. A system for detecting an object within a detection region comprising:
   a) means for projecting radiation in the direction of the object to be detected;
   b) a pair of radiation detector units for receiving the radiation reflected from the object to be detected upon contact with said projected radiation and for producing output signals indicative thereof, said pair of radiation detector units being constructed and angularly oriented relative to each other so that their fields of view intersect to provide a four sided detection zone common to both of said fields of view, the radiation from the radiation projecting means passing through at least a portion of said four sided detection zone, the portion of the detection zone onto which radiation is projected constituting a detection region; and
   c) means coupled to said pair of radiation detector units for producing a detection signal when an output signal has been emitted from both of said radiation detector units, said detection signal indicating that the object to be detected is within said detection region.

15. The system as claimed in claim 14 wherein said radiation is electromagnetic radiation.

16. The system as claimed in claim 14 wherein said radiation is acoustic radiation.

17. A system of detecting an object within a detection region comprising:
   a) a light source for projecting a beam of light in the direction of the object to be tested when energized,
   b) a pair of light detector units, each light detector unit including:
      i) a first output terminal,
      ii) a second output terminal,
      iii) means for generating a pulsating light source drive signal,
      iv) a light detector for receiving light and producing therefrom an electrical signal output,
      v) circuitry coupling said output of said light detector to said first output terminal and said light source drive signal generating means to said second output terminal such that a signal outputted from said first output terminal is synchronized with the drive signal outputted from said second output terminal,
   c) a signal indicator,
   d) first circuitry coupling said second output terminal of each light detector unit to said light source so as to energize said light source only when an output signal is emitted from both second output terminals, and e) second circuitry coupling said first output terminal of each light detector unit to said signal indicator so as to energize said signal indicator only when an output signal is emitted from both first output terminal, f) said light detector units being constructed and angularly oriented relative to each other so that the fields of view of their respective light detectors intersect to provide a four sided detection zone common to both of said fields of view, the beam of light form said light source passing through at least a portion of said four side detecting zone, the portion of the detection zone illuminated by said beam of light constituting a detection region.

18. The system of claim 17 wherein said light source is an infrared light source.

19. The system of claim 17 wherein said fields of view are diverging in shaped.

20. The system of claim 17 wherein said first and second circuitry each include an AND gate.

21. A system for detecting an object within a detection region comprising:

a) a light source for projecting a beam of light in the direction of the object to be tested, b) a pair of light detectors for receiving light reflected from said object on illumination by said light source and producing output signals indicative thereof, said pair of light detectors being oriented relative to each other so that their fields of view intersect to provide a four sided zone common to both fields of view, c) said beam of light from said light source passing through at least a portion of said four sided zone, the portion of said four sided zone defining a detection region, and d) means coupled to said light detectors for producing a detection signal when an output signal is simultaneously outputted from both of said light detectors, e) whereby, a detection signal will be produced when an object is detected in said detection region.

* * * * *

UNITED STATES PATENT AND TRADEMARK OFFICE
CERTIFICATE OF CORRECTION

PATENT NO. : 5,245,177
DATED : September 14, 1993
INVENTOR(S) : Norman H. Schiller It is certified that error appears in the above-indentified patent and that said Letters Patent is hereby corrected as shown below:

On the title page, item [54] and column 1, line 4, change "SYSTEM" to --REGION--.

Signed and Sealed this

Nineteenth Day of April, 1994

*Attest:*

*Attesting Officer*

BRUCE LEHMAN

*Commissioner of Patents and Trademarks*